United States Patent [19]
Albrecht et al.

[11] Patent Number: 5,923,272
[45] Date of Patent: Jul. 13, 1999

[54] SERIAL BITSTREAM CODE FOR TIMING-BASED SERVO

[75] Inventors: Thomas Robert Albrecht, San Jose, Calif.; Glen Alan Jaquette, Tucson, Ariz.

[73] Assignee: International Business Machines Corporation, Armonk, N.Y.

[21] Appl. No.: 08/889,532

[22] Filed: Jul. 8, 1997

[51] Int. Cl.$^6$ .................................................. H03M 7/00
[52] U.S. Cl. .......................................... 341/55; 360/77.12
[58] Field of Search .................... 341/50, 55; 360/77.07, 360/77.12

[56] References Cited

U.S. PATENT DOCUMENTS

| | | | |
|---|---|---|---|
| 4,549,232 | 10/1985 | Axmear et al. | 360/77 |
| 5,003,412 | 3/1991 | Bizjak et al. | 360/77.01 |
| 5,070,421 | 12/1991 | Sumiya et al. | 360/77.07 |
| 5,321,570 | 6/1994 | Behr et al. | 360/77.12 |
| 5,689,384 | 11/1997 | Albrecht et al. | 360/77.12 |

Primary Examiner—Howard L. Williams
Attorney, Agent, or Firm—John H. Holcombe; Robert M. Sullivan

[57] ABSTRACT

Disclosed is a coding technique which takes advantage of the use of an internal synchronization technique for a timing-based servo which employs alternating 4 and 5 transition bursts of servo to provide a simplified synchronization of the data, and comprises a coding technique which employs a periodic pattern of bursts each period comprising two bursts of 5 transitions followed by two bursts of 4 transitions. The code provides, in each burst of 5 transitions, two defined positions for the 2nd and 4th transitions, spaced from equally spaced positions in the burst, to represent each of two bit values. The code provides, in each burst of 4 transitions, two defined positions for the 2nd and 3rd transitions, spaced from equally spaced positions in the burst, to represent each of two bit values. The bitstream is encoded in words comprised of one or more 4 bit symbols, the words separated by a 6 bit word separator symbol, 2 of the symbols of the possible 16 employed for the word separator symbol, leaving 14 symbols available for data.

39 Claims, 6 Drawing Sheets

| SYNC MARKER: | 100000 | | (THE 1 MUST BE ENCODED IN A 5-PULSE BURST) |
|---|---|---|---|
| SYMBOLS: | 0001 | D | (ALL SYMBOLS BEGIN ON A 5-PULSE BURST) |
| | 0010 | C | |
| | 0011 | B | |
| | 0100 | A | |
| | 0101 | 9 | |
| | 0110 | 8 | |
| | 0111 | 7 | |
| | 1001 | 6 | |
| | 1010 | 5 | |
| | 1011 | 4 | |
| | 1100 | 3 | |
| | 1101 | 2 | |
| | 1110 | 1 | |
| | 1111 | 0 | |

SERIAL BITSTREAM CODE FOR TIMING-BASED SERVO

Commonly assigned U.S. Pat. No. 5,689,384, Albrecht et al., is incorporated for its showing of a timing based servo system for magnetic tape systems.

Commonly assigned U.S. patent application Ser. No. 08/859,830, filed May. 16, 1997, Albrecht et al., is incorporated for its showing of shifting the transitions of a timing based servo system to superimpose data on the servo signals.

TECHNICAL FIELD

This invention relates to timing-based servos for longitudinal recording, such as for magnetic tape drives, and, more particularly, to a code for superimposing a serial bitstream on the servo, and apparatus and method for writing and decoding the coded serial bitstream.

BACKGROUND OF THE INVENTION

One method magnetic tape devices utilize to maximize capacity is to maximize the number of parallel tracks on the tape. The typical way of maximizing the number of tracks is to employ servo systems which provide track following and allow the tracks to be spaced very closely. Even so called "low end" tape devices are now employing track following to maximize the number of tracks.

An example of track following servoing is the provision of groups of prerecorded parallel longitudinal servo tracks that lie between groups of longitudinal data tracks, so that one or more servo heads may read the servo information and an accompanying track following servo will adjust the lateral position of the head or of the tape to maintain the servo heads centered over the corresponding servo tracks. The servo heads are spaced a defined distance from the data heads, so that centering the servo heads results in the data heads being centered over the data tracks. The defined distance is maintained for all tape drives in a particular family allowing exchange of tape media between tape drives in the same or compatible families.

An example of a track following servo system particularly adapted to tape comprises that of the Albrecht, et al. U.S. Pat. No. 5,689,384. The servo patterns are comprised of magnetic flux transitions recorded in continuous lengths across a track at non-parallel angles, such that the timing of the servo transitions read from the servo pattern at any point on the pattern varies continuously as the head is moved across the width of the servo pattern. For example, the pattern may comprise a pair of opposed transitions, each called a "chevron", which appear as a diamond, which transitions are sloped or slanted with respect to the track in the longitudinal direction. Thus, the relative timing of transitions read by a servo read head varies linearly depending on the lateral position of the head. Speed invariance is provided by utilizing a group of interlaced pairs of transitions and determining the ratio of two timing intervals, the interval between two like transitions compared to the interval between two dissimilar transitions. Synchronization of the decoder to the servo pattern may be accomplished by having two separate groups of pairs of transitions, each group having a different number of pairs of transitions. Thus, the position in the set of groups is readily determined by knowing the number of pairs of transitions in the present group.

In order to determine the longitudinal position of the tape, the Albrecht et al. U.S. Pat. No. 08/859,830 application discloses a magnetic tape media having data information superimposed on the timing-based servo information of the Albrecht et al. U.S. Pat. No. 5,689,384, which data information may comprise longitudinal addressing or tachometer information. At least two transitions of the servo information are shifted longitudinally with respect to other of the transitions of the servo information, the shifted transitions comprising the superimposed addressing data information. The reason two transitions are shifted is to maintain the timing between pairs of transitions required for the timing-based servo. The two shifted transitions may be in the same set of patterns or "chevrons", or may be in opposed chevrons called a "diamond" pattern.

The codes and resultant patterns described in the Albrecht et al. U.S. Pat. No. 08/859,830 application are primarily adapted for other than the very low end tape drives to contain a large amount of data and are therefore somewhat complicated and require extensive logic to decode.

Such an ability to superimpose data in a timing-based servo is also of high value in very low end tape drives, so as to eliminate the need for an expensive tachometer. The ideal solution required is a coding scheme which allows decoding to be accomplished without extensive use of logic in addition to that of the servo.

SUMMARY OF THE INVENTION

Disclosed is a coding technique which takes advantage of the use of an internal synchronization technique for a timing-based servo to provide a simplified synchronization of serial bitstream data, and comprises a coding technique for the serial bitstream which employs a periodic pattern of bursts each period comprising two bursts of 5 transitions followed by two bursts of 4 transitions. In one embodiment, the code provides, in each burst of 5 transitions, two defined positions for the 2nd and 4th transitions, spaced from equally spaced positions in the burst, to represent each of two bit values. The code provides, in each burst of 4 transitions, two defined positions for the 2nd and 3rd transitions, spaced from equally spaced positions in the burst, to represent each of two bit values. The bitstream is encoded in words comprised of one or more 4 bit symbols, the words separated by a 6 bit word separator symbol. Being able to readily find the separator symbol requires elimination of 2 of the possible 16 4-bit symbols, leaving 14 4-bit symbols available for data.

The coding technique is sensed by a simplified technique suitable for low end tape drives accumulating the spacings between the defined position transitions of the two bursts of a 5 transition period and accumulating the spacings between two of the non-defined position transitions of the two bursts of the 5 transition period for comparison, and accumulating the spacings between the defined position transitions of the two bursts of a 4 transition period and accumulating the spacing between two of the non-defined position transitions of one of the two bursts of the 4 transition period for comparison.

For a fuller understanding of the present invention, reference should be made to the following detailed description taken in conjunction with the accompanying drawings.

DETAILED DESCRIPTION OF THE INVENTION

Figure 1:
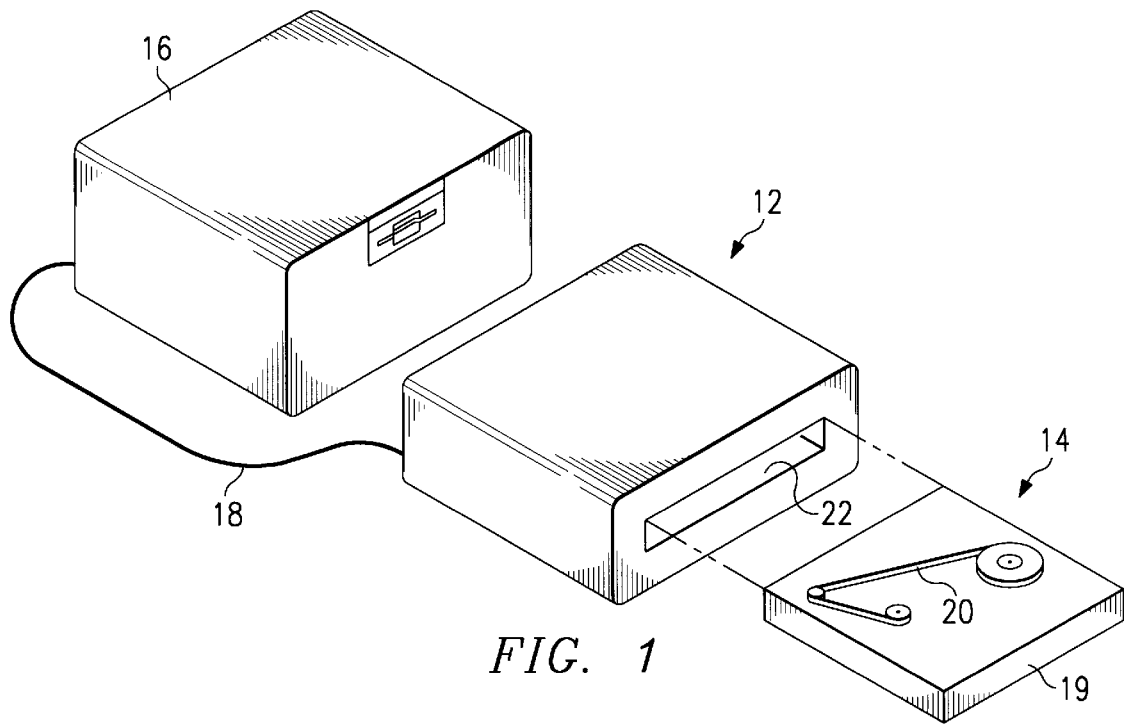
FIG. 1 is a perspective view representation of a tape drive data storage device and associated tape cartridge which may employ the coding of the present invention.

Referring to FIG. 1, a timing based servo system is illustrated which reads a servo pattern and reads the data encoded in the servo pattern in accordance with an embodiment of the present invention. Referring to FIG. 1, the system includes a tape drive 12 that accepts a tape data cartridge 14 and is connected to a tape controller of host processor 16 by a cable 18. The tape cartridge 14 comprises a housing 19 containing a length of magnetic tape 20. The tape drive 12 includes a receiving slot 22 into which the cartridge 14 is inserted. The host processor 16 can comprise any suitable processor, for example, a personal computer such as the IBM "Aptiva", or can be a workstation such as the IBM "RS6000", or can be a systems computer, such as the IBM "AS400". The tape drive 12 is preferably compatible with the associated host processors and can assume any one of a variety of cartridge or cassette linear formats. Examples of such tape drives are preferably "low end" tape drive units, such as "Digital Linear Tape" or "Travan" compatible tape drives.

Figure 2:
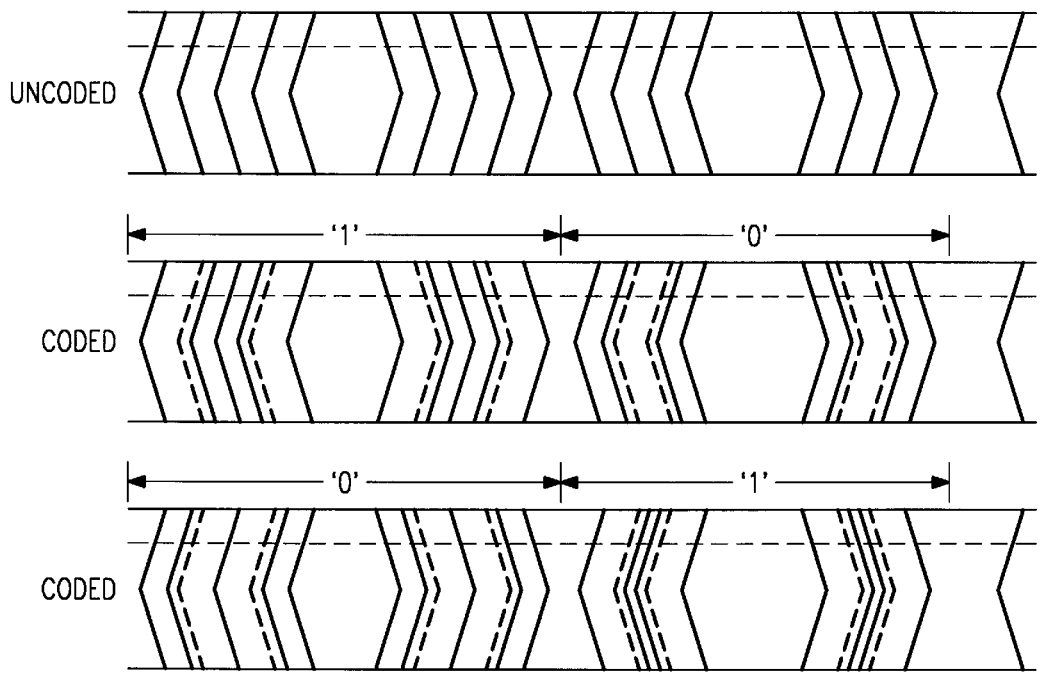
FIG. 2 is a diagrammatic representation of an uncoded servo pattern and two examples of encoded servo patterns in accordance with the present invention.

FIG. 2 illustrates an uncoded timing-based servo pattern of the Albrecht et al. U.S. Pat. No. 5,689,384. The servo patterns are comprised of magnetic flux transitions recorded in continuous lengths across a track at non-parallel angles, such that the timing of the servo transitions read from the servo pattern at any point on the pattern varies continuously as the head is moved across the width of the servo pattern. The pattern may comprise a pair of opposed transitions, each called a "chevron", which appear as a diamond, which transitions are sloped or slanted with respect to the track in the longitudinal direction. Thus, the relative timing of transitions read by a servo read head varies linearly depending on the lateral position of the head. Speed invariance is provided by utilizing a group of interlaced pairs of transitions and determining the ratio of two timing intervals, the interval between two like transitions compared to the interval between two dissimilar transitions. Synchronization of the decoder to the servo pattern may be accomplished by having two separate groups of pairs of transitions, each group having a different number of pairs of transitions. Thus, the position in the set of groups is readily determined by knowing the number of pairs of transitions in the present group.

Two examples of encoded servo patterns in accordance with an embodiment of the present invention are then illustrated in FIG. 2. Specifically, bits are encoded by shifting the 2nd and 4th transitions of a 5 transition burst and shifting the 2nd and 3rd transitions of a 4 transition burst. The unshifted positions for the transitions are illustrated as dashed chevrons. The chevrons are shifted identically in both halves of the diamond patterns. The encoding pattern employs alternating 5 and 4 transition bursts to provide a simplified synchronization of the data, as will be explained, and comprises a coding technique which employs a periodic pattern of bursts each period comprising a diamond of two bursts of 5 transitions followed by a diamond of two bursts of 4 transitions. The code provides, in each burst of 5 transitions, two defined positions for the 2nd and 4th transitions, spaced from equally spaced positions in the burst, to represent each of two bit values. The code provides, in each burst of 4 transitions, two defined positions for the 2nd and 3rd transitions, spaced from equally spaced positions in the burst, to represent each of two bit values.

Thus, in the center example, a "1" bit is encoded by shifting the positions of the 2nd and 4th chevrons of the 5 chevron pattern closer together. The next bit shown is a "0" in a 4 chevron pattern, which is encoded by shifting the positions of the 2nd and 3rd chevrons of the 4 chevron pattern further apart. In the bottom example, a "0" bit is encoded in a 5 chevron pattern by shifting the positions of the 2nd and 4th chevrons of the 5 chevron pattern further apart. The next bit shown is a "1" in a 4 chevron pattern, which is encoded by shifting the positions of the 2nd and 3rd chevrons of the 4 chevron pattern closer together.

Figures 3, 4:
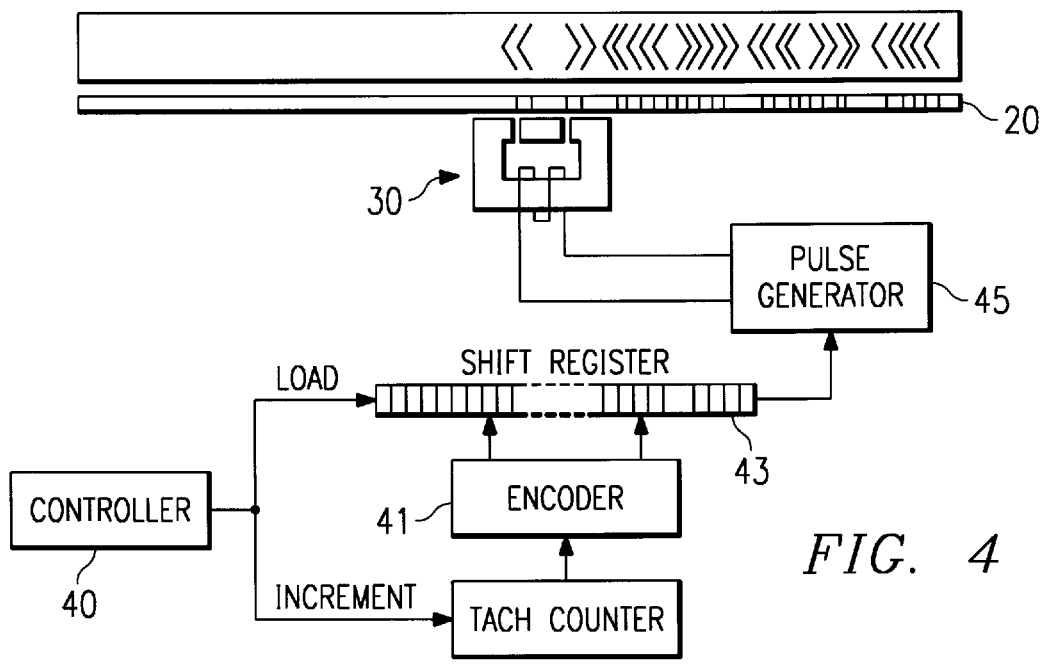
FIG. 3 is a representation of the symbol encoding and sync marker of the present invention.
FIGS. 4 and 5 are schematic and block diagrams of a writing generator for writing the encoded transitions of the present invention.

FIG. 3 illustrates the encoding of four bit symbols and a 6 bit sync marker in accordance with the present invention. Of the 16 possible patterns available for symbols, 2 patterns are excluded in order to provide a sync marker which separates the words of the encoded serial bitstream. Thus, the patterns "1000" and "0000" are excluded in order to provide the 6 bit sync marker pattern "100000".

Words may therefore comprise a bitstream of length divisible by 4, which is the number of bits in a symbol. The word length comprises the length of the word plus the 6 bits of the sync marker. Thus,

WORD LENGTH=(N·4)+6.

In order to provide symbol synchronization and word synchronization, every symbol and the sync marker are required to begin with the same two chevron diamond pattern. Thus, in one example, every symbol and the sync marker must begin with a 5 diamond pattern. This is the example of the illustrated embodiment. As an alternative, therefore, every symbol and the sync marker must begin with a 4 diamond pattern.

Figure 5:
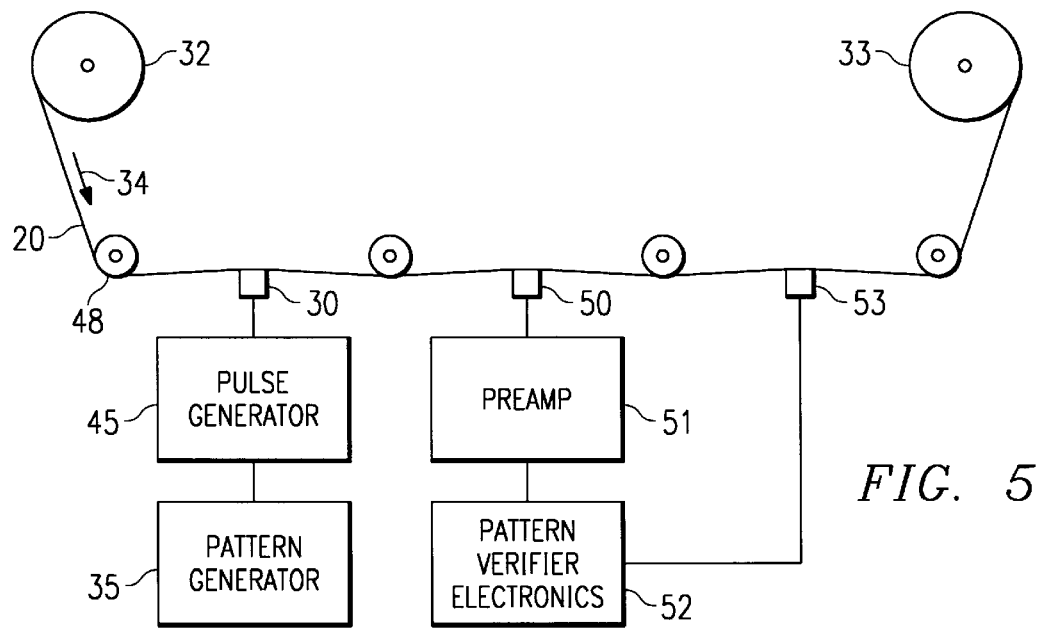

In FIGS. 4 and 5, a head 30 is illustrated for writing the encoded servo pattern on tape 20. The tape is moved between reels 32 and 33 in the direction of arrow 34. Pattern generator 35 of FIG. 5 is illustrated in detail in FIG. 4 and comprises a controller 40 and encoder 41. The pattern generator and pulse generator are depicted as tied to both patterned gaps of head 30. The encoded data is loaded from the encoder to shift register 43 under the control of the controller and is shifted to pulse generator 45. The shift register represents the timing of the supply of pulses by the pulse generator to cause head 30 to simultaneously write both chevrons of the diamond on tape 402. Thus, rather than a regular repeating chevron pattern of the Albrecht et al. U.S. Pat. No. 5,689,384, the shift register data modulates the timing of the selected pulse generator so as to shift the chevrons of the diamonds to superimpose the desired data on the servo pattern. The precision is attained by matching pulse generator 45 to a constant clock and monitoring the tape speed at idle wheel 48 to hold the tape speed as constant as possible.

Referring to FIG. 5, the encoded servo pattern is detected by read head 50, amplified by circuit 51 and verified by pattern verifier 52. Errors may be noted by applying an error signal at head 53.

Figure 6:
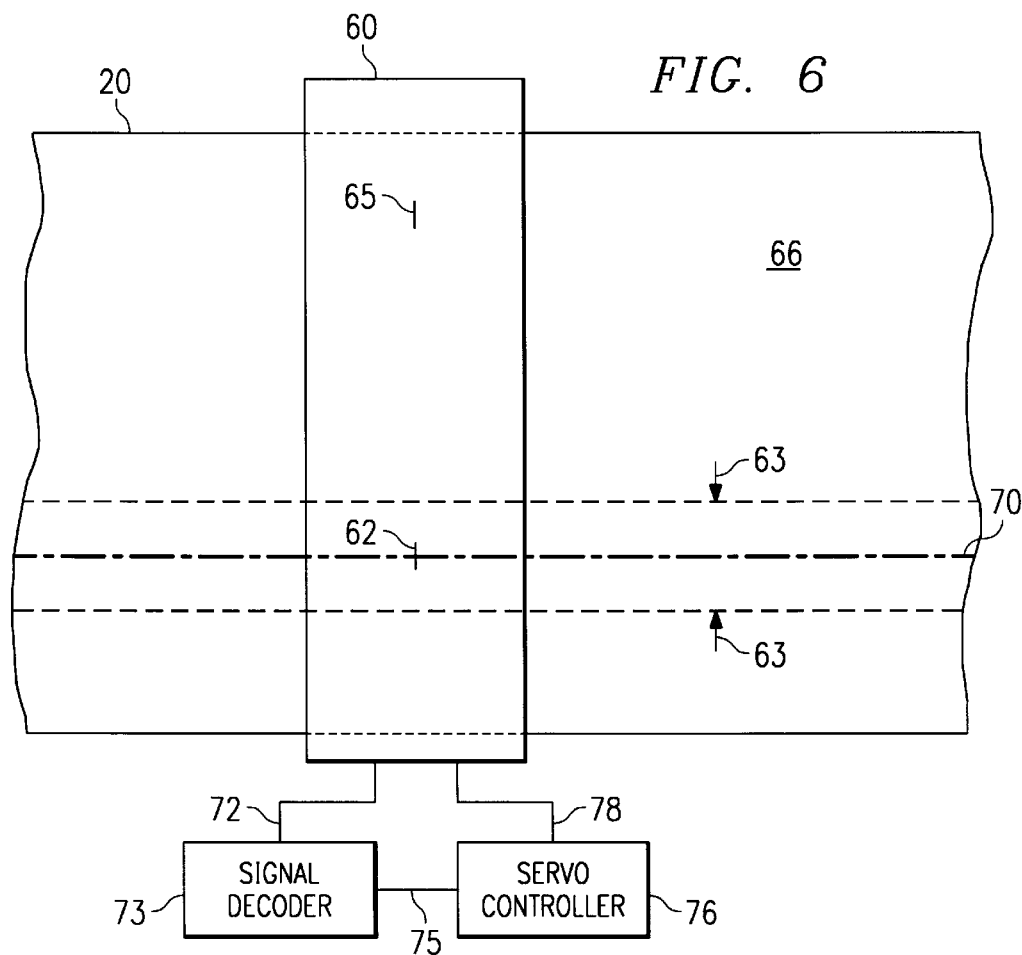
FIG. 6 is a schematic and block diagram of a magnetic read/write head and the servo head and system of the tape drive data storage device and associated tape cartridge of the present invention.

FIG. 6 is a view looking at a portion of the magnetic tape 20 of the cartridge 14 in the tape drive 12 of FIG. 1. A tape drive 12 typically includes drive motors (not shown) for rotating the reels of the cartridge 14 to move the tape 20 across a head assembly 60. The head assembly is shown in solid lines and includes a relatively narrow servo read head 62 that detects a servo pattern recorded in a servo track 63 of the tape. A data head 65 of the head assembly is typically larger than the servo head and is positioned over a data track region 66 of the tape containing multiple data tracks for reading data recorded in a data track, or for writing data in a data track. FIG. 2 shows a single servo read head and a single data head for simplicity of illustration. Those skilled in the art will appreciate that some low end tape systems have multiple parallel servo tracks, multiple servo read heads, and multiple data read and write heads.

The servo track centerline 70 is indicated as extending along the length of the tape 20. The servo read head 62 is relatively narrow and has a width substantially less than the width of the servo track 63. In accordance with the incorporated Albrecht et al. et al. U.S. Pat. No. 5,689,384, the tape is moved longitudinally across the tape head assembly 60 so that the servo track 63 is moved linearly with respect to the servo head 62. When such movement occurs, the servo pattern of magnetic flux transitions is detected by the servo read head 62 so that it generates an analog servo read head signal that is provided via a servo signal line 72 to a signal decoder 73. The signal decoder processes the servo read head signal and generates a position signal that is transmitted via position signal lines 75 to a servo controller 76. The servo controller generates a servo control signal and provides it on control lines 78 to a servo positioning mechanism at head assembly 60. The servo positioning mechanism responds to the control signal from the servo controller by moving the assembly including servo head 62 laterally with respect to the servo track centerline 70 to reach the desired servo track or to maintain the data head centered with respect to the respective data track.

Figure 7:
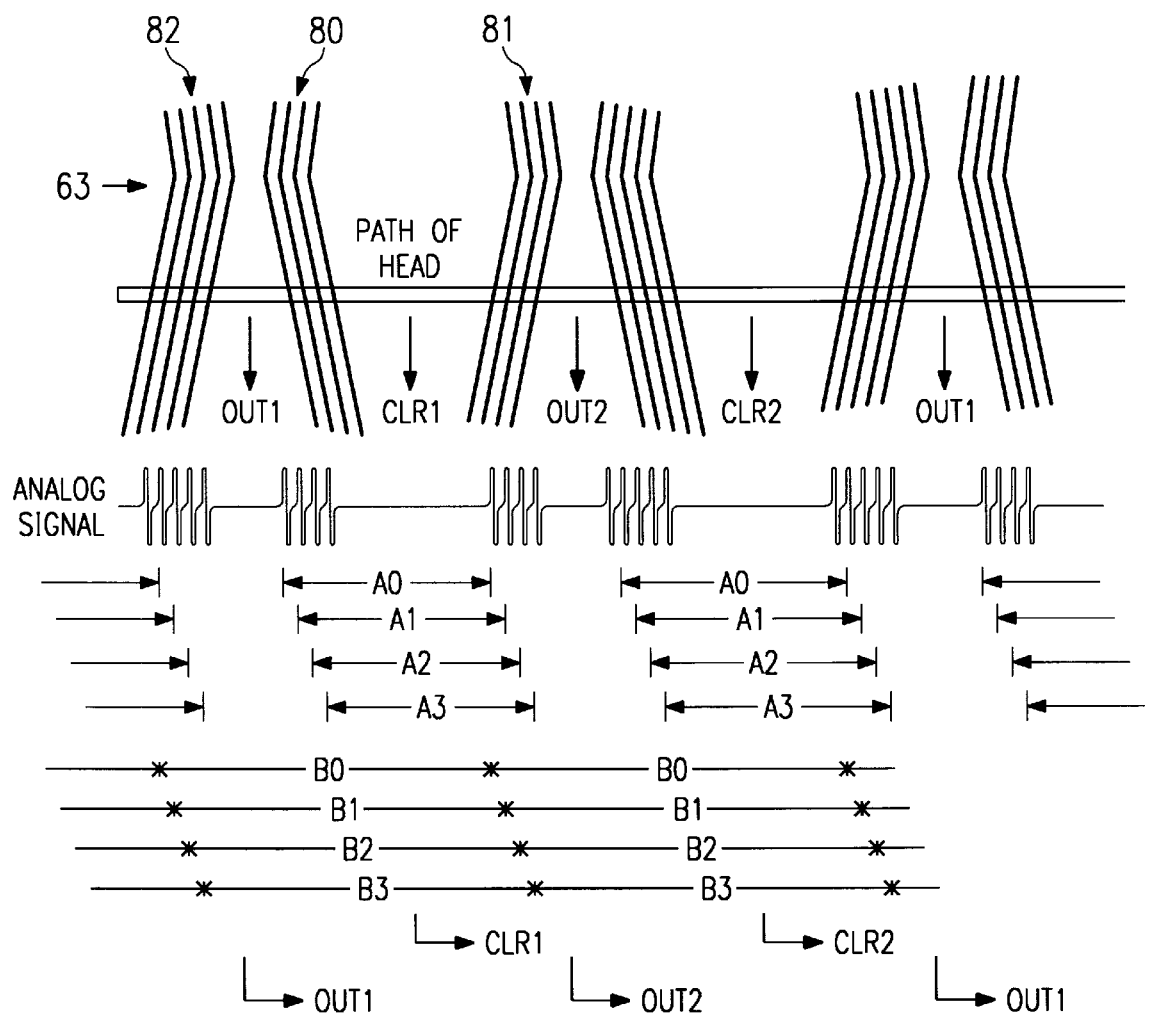
FIG. 7 is a diagrammatic representation of a servo head as it tracks the servo pattern, along with a representation of the head output signal it generates and the corresponding A and B signal intervals.

FIG. 7 illustrates the timing-based servo pattern of the Albrecht et al. U.S. Pat. No. 5,689,384. Those skilled in the art will recognize that the vertical lines represent stripes of magnetic flux transitions or areas of magnetic flux that extend across the width of a servo track. In the case of areas of magnetic flux, the edges comprise flux transitions that are detected to generate the servo read head signal. The transitions have two magnetic polarities, one on each edge of a stripe. Referring additionally to FIG. 6, when the servo read head 62 crosses a transition, it produces a pulse whose polarity is determined by the polarity of the transition. For example, the servo head might produce positive pulses on the leading edge of each stripe and negative pulses on the trailing edge. Preferably, only the leading edge positive pulses are employed in the decoder in the forward direction and trailing edge positive pulses in the reverse direction.

The servo pattern 63 comprises repeating transitions having two different orientations. First "chevrons" 80 extend across the width of a servo track and have a first orientation slanted with respect to the longitudinal direction of the track. Second stripes or chevrons 81 also extend across the width of a servo track, but have a slanted orientation opposite to that of the chevrons 80.

Each chevron 80 and the corresponding chevron 81 comprise a pair of transitions separated by a predetermined distance $A_0$, $A_1$. $A_2$ and $A_3$. In the arrangement of the Albrecht et al. U.S. Pat. No. 5,689,384, each of the predetermined distances is identical. The apex of each of the chevrons is located at the servo track centerline. The chevrons 80 and 81 form diamond-shaped patterns that are symmetric about the track centerline.

Thus, as the tape is moved linearly with respect to a servo read head, the servo read head generates an analog servo read head signal having peaks whose peak-to-peak timing varies as the head is moved across the width of the track. This variation in timing is used to determine the relative transverse position of the magnetic servo read head within the servo track. Typically, only the positive polarity transitions are employed for the servo timing measurement.

The servo patterns illustrated in FIG. 7 include a first set of pairs of transition chevrons 80 and 81, and a second set of pairs of transition chevrons 82 and 81. Transitions 82 and 81 are separated by a predetermined distance $B_0$, $B_1$, $B_2$ and $B_3$. The A and B intervals are used to generate a position signal that is independent of tape speed. It is important that only the A intervals, which are between chevrons at the opposite sides of the diamond-shaped patterns, or diamonds, vary with transverse position. The B intervals are constant, regardless of position. Thus, the servo position signal is generated by timing the intervals and calculating their ratio.

The ability to ascertain whether diamonds or like pairs are being read may be determined by having different numbers of chevrons in alternating groups of diamonds. As shown in FIG. 7, 4 chevrons 80 and 81 are provided in the one diamond, and 5 chevrons 82 are provided in the other diamond.

Figure 8:
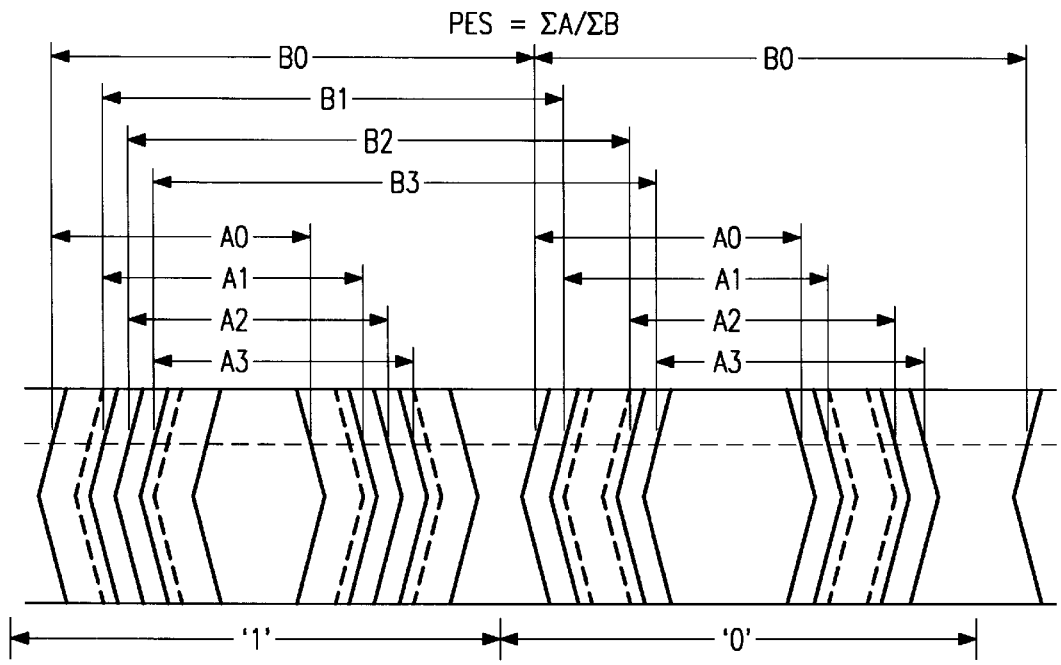
FIG. 8 is a diagrammatic representation of the spacing of the transitions encoded in accordance with the present invention.

FIG. 8 illustrates the chevrons and diamonds of FIG. 7 where ones of the transitions are shifted longitudinally with respect to the tape to encode data into the servo track.

For the servo loop, the Position Error signal is determined from the equation:

$$\text{error signal}=(A0+A1+A2+A3)/(B0+B1+B2+B3)$$

Where A0 is the distance between the first chevron of the forward group and the first chevron of the reverse group, A1 is the distance between the second chevron of the forward group and the second chevron of the reverse group, etc. Likewise, B0 is the distance between the first chevron of the forward group and the first chevron of the next forward group, B1 is the distance between the second chevron of the forward group and the second chevron of the next forward group, etc.

Figure 9:
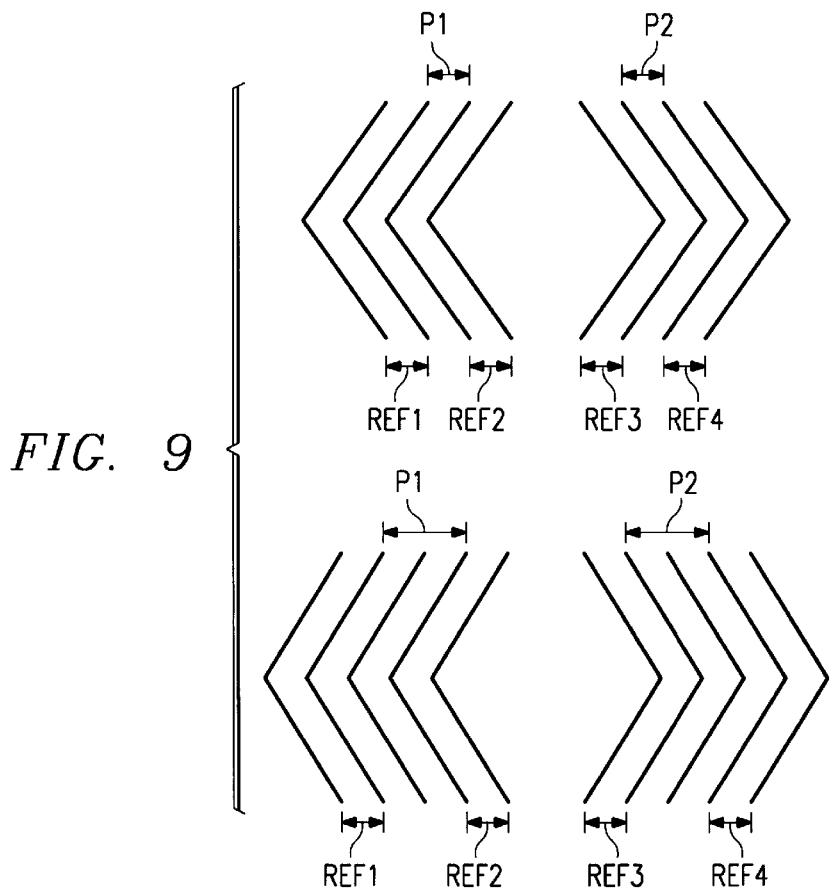
FIG. 9 is a diagrammatic representation of one example of a decoding technique of the present invention.

FIG. 9 illustrates one embodiment of a decoding technique of the present invention. The illustrated patterns comprise a 4 chevron pattern 90 in which the 2nd and 3rd chevrons are shifted in the longitudinal direction, towards each other to represent a "1" bit and away from each other to represent a "0" bit. In accordance with the present invention, both sets of chevrons in each half of the 4 chevron diamond are shifted to represent the same bit. A 5 chevron pattern 91 is encoded by shifting the 2nd and 4th chevrons in the longitudinal direction, towards each other to represent a "1" bit and away from each other to represent a "0" bit. Also, in accordance with the present invention, both sets of chevrons in each half of the 5 chevron diamond are shifted to represent the same bit.

The selection of the chevrons to be shifted is made so as to render the encoding bidirectional. Thus, whether the tape is moving from right to left or from left to right, the 2nd and 3rd chevrons are still shifted in a 4 chevron pattern, and the 2nd and 4th chevrons are still shifted in a 5 chevron pattern.

In one embodiment of a decoding algorithm that is simple to employ, and which attains speed independent decoding, the shifted intervals P1 and P2 are compared with reference intervals Ref or Ref1 and Ref2. The specific comparison is of shifted intervals to unshifted, equal length intervals. Thus, it will be simple to determine whether the shifting of the chevrons is toward or away from each other. An exemplary algorithm for making the comparisons is as follows:

In a 4 burst, the comparison is between a single length interval P1 and another single length interval P2 to four reference interval lengths:

Is 2(P1+P2)>Ref1+Ref2+Ref3+Ref4 ? YES=0; NO=1.

In a 5 burst, the comparison is between P1 and P2 intervals of two interval lengths and four reference interval lengths:

Is P1+P2>Ref1+Ref2+Ref3+Ref4 ? YES=0; NO=1.

A wide variety of decoding algorithms may be utilized with varying degrees of signal to noise and error checking capabilities.

Figure 10:
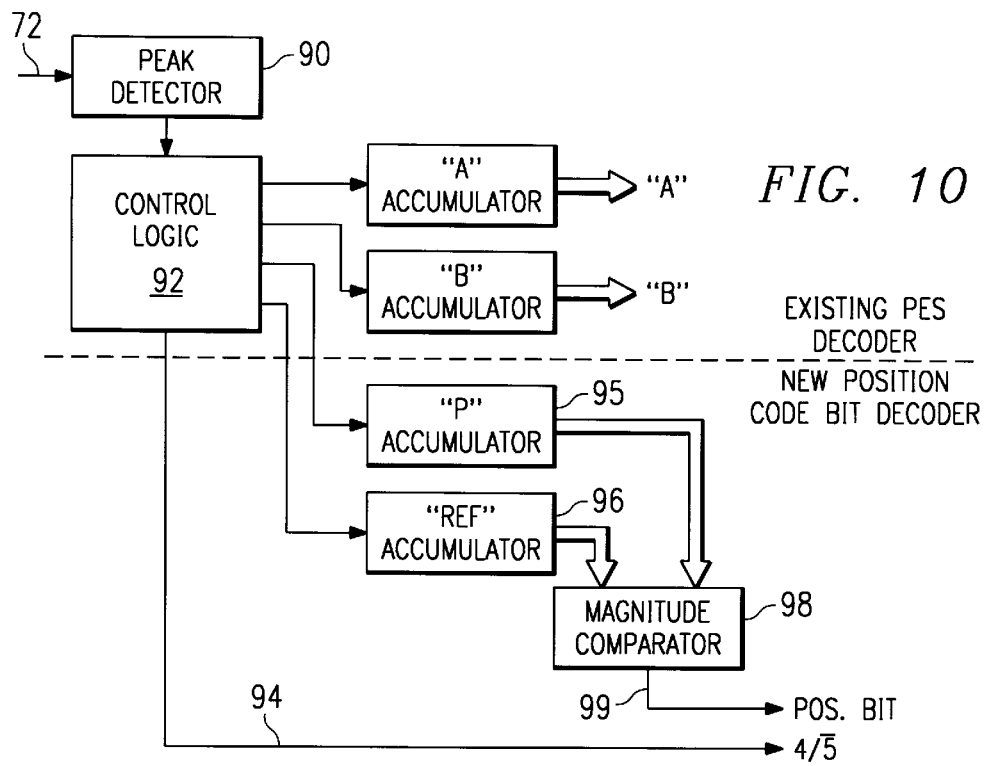
FIG. 10 is a block diagram of a bit decoder of the present invention.

FIG. 10 illustrates an embodiment of circuitry for providing both the "A" and "B" signals for the servo system and for providing the bit signals for the decoded bitstream data.

A peak detector 90 converts the analog signal on line 72 from the servo head 62 of FIG. 6 into pulses representing either the leading edges or the trailing edges of the transitions. The preferred embodiment is to switch from logic "low" to logic "high" upon detection of positive peaks, and from "high" to "low" at negative peaks. The detector triggers the timing of all intervals from only the positive polarity peaks.

Control logic 92 determines whether 4 or 5 chevron patterns are encountered and provides the "A" and "B" intervals for the servo system and the "P" and "Ref" intervals for the one embodiment of the present invention. The logic of control logic 92 is preferably fixed logic created by high level logic design language. The "A" and the "B" timing counts are accumulated and the accumulated servo data to be compared are provided by the servo system of the Albrecht et al. U.S. Pat. No. 5,689,384, illustrated in FIG. 10 as "Existing PES Decoder". The 4 or 5 chevron pattern signal is issued in the form of a "4 and not 5" bit on line 94.

Accumulator 95 accumulates the timing counts of "P1" and "P2" twice for a 4 diamond burst, and accumulates the timing counts of "P1" and "P2" for a 5 diamond burst, in accordance with the algorithm described with respect to FIG. 9. Accumulator 96 accumulates the timing count of the four "Ref" intervals for both a 4 diamond burst and a 5 diamond burst, in accordance with the algorithm described with respect to FIG. 9. Magnitude comparator 98 compares the "P" and "Ref" accumulated counts and, if the "P" accumulated timing count is greater than the "Ref" accumulated timing count, issues a "1" bit signal on line 99. If the "P" accumulated timing count is less than the "Ref" accumulated timing count, magnitude comparator 98 issues a "0" bit signal on line 99.

In FIG. 9, the bursts contain redundant information, since in each burst the following intervals are identical: P1 and P2, Ref1 and Ref3, and Ref2 and Ref4. Therefore an error checking algorithm can be implemented as follows:

In a 4-burst:
If (2P1>Ref1+Ref2), Boolean0=1, else=0;
If (2P2>Ref3+Ref4), Boolean1=1, else=0;
If (Boolean0XOR Boolean1)==0, then Error=0, else=1.

In a 5-burst:
If (P1>Ref1+Ref2), Boolean0=1, else=0;
If (P2>Ref3+Ref4), Boolean1=1, else=0;
If (Boolean0XOR Boolean1)==0, then Error=0, else=1.

For both cases, if Error=1, then the two sets of redundant intervals are not in agreement, indicating that an error has occured.

The decoded data bits on line 99 comprise the data bitstream. A decoder illustrated in FIG. 11 comprises an embodiment of a symbol and word decoder for generating words of symbols from the data bitstream. In the illustrated example, a word comprises 34 bits, a 6 bit sync marker and 28 bits of data, comprising 7 4-bit symbols.

Since the sync marker is required to begin only in the 4 burst pattern or, alternatively, only in the 5 burst pattern, a sync detector 100 only detects the occurrence of the sync bit pattern from line 99 in shift register 102 together with the indication of the correct burst pattern on line 94. In the current example, all symbols and the sync marker begin in a 5 burst pattern and end in a 4 burst pattern. The signal on line 94 therefore indicates that the 4 burst pattern is being received by the shift register 102 and, if a sync marker match is indicated by the sync detector, indicates thereby that it is a sync marker at the appropriate point in the bitstream. Sync detector 100 then provides a latch output on line 105 to transfer the contents of shift register 102 to register 108. The transferred content comprises the 28 bits of the 7 4-bit symbols of the word detected prior to the detection of the sync marker.

The latch signal on line 105 is also provided to the host on line 106 to signal that a word is ready. The decoded serial bitstream may be provided directly to the host or may be transmitted to a data selector 110 which may be operated by the host on lines 111 to select which of the symbols to read. The data selector provides the selected symbols to a ROM look-up table 112 to further decode the symbols to represent specific signals to be provided to the drive controller on lines 115.

Figure 11:
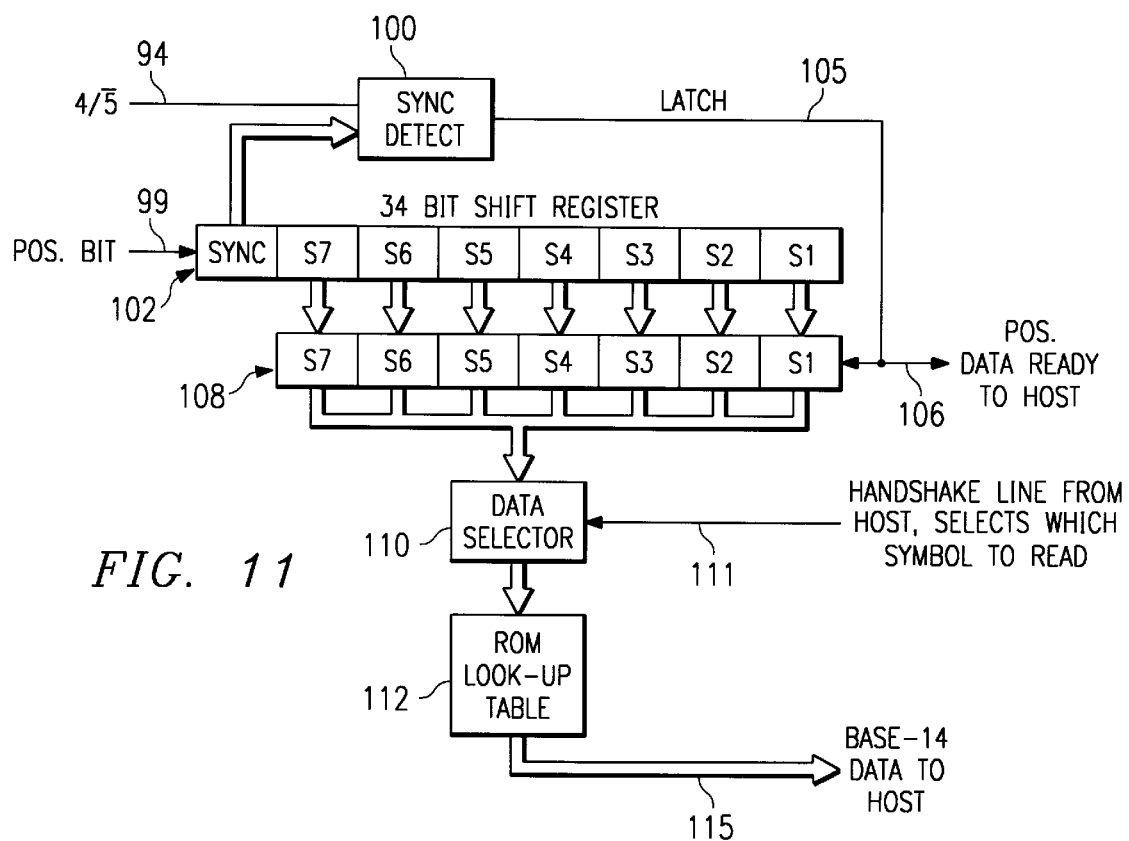
FIG. 11 is a block diagram of a data word decoder of the present invention.

The decoding circuitry of FIGS. 10 and 11 comprise relatively simple circuitry which is less expensive to provide and is especially suitable for low end tape drives.

As an alternative arrangement, the encoding pattern may comprise a shifting of transitions to represent one bit value, and no shifting of transitions to represent another bit value.

Although 5 and 4 transition burst patterns comprise the preferred embodiment, other patterns may be utilized within the scope of the present invention. Such patterns comprise, in each period, at least one burst of X transitions, followed by at least one burst of Y transitions, X and Y differing by at least one transition. The word separator symbol begins in only the X transition bursts or in only the Y transition bursts.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for encoding a serial bitstream in a timing-based servo pattern, the pattern being periodic, each period comprising two bursts of 5 transitions followed by two-bursts of 4 transitions; comprising the steps of:

shifting the 2nd and 4th transitions of 5 transition bursts from equally spaced positions in said burst to one of two defined positions to represent each of two bit values;

shifting the 2nd and 3rd transitions of 4 transition bursts from equally spaced positions in said burst to one of two defined positions to represent each of two bit values; and encoding said serial bitstream in words comprised of one or more 4 bit symbols, said words separated by a 6 bit word separator symbol.

2. The encoding method of claim 1, wherein:

said two defined positions of said shifting steps each comprises shifts of said transitions respectively toward or away from each other, from said equally spaced positions by approximately equal distances.

3. The encoding method of claim 2, wherein:

said step of encoding said word separator symbol comprises always encoding said pattern of 6 bits to begin in only said 4 transition bursts or in only said 5 transition bursts.

4. The encoding method of claim 3, wherein:

said 4 bit symbols of said encoding step comprise ones of 14 different bit patterns of 4 bits each and 2 bit patterns of 4 bits are excluded as representing said word separator symbol.

5. The encoding method of claim 4, wherein:

said step of encoding said word separator symbol comprises encoding a pattern of 6 bits combining said 2 excluded bit patterns of 4 bits.

6. The encoding method of claim 5, wherein:

said 2 excluded bit patterns of 4 bits comprise "0000" and "1000" and said word separator symbol comprises the 6 bits "100000".

7. A sensible transition pattern for recording a serial bitstream in a timing-based servo pattern on a recording medium, said pattern being periodic, each period comprising two bursts of 5 transitions followed by two bursts of 4 transitions, comprising:

each burst of 5 transitions having two defined positions for the 2nd and 4th transitions, spaced from equally spaced positions in said burst, to represent each of two bit values;

each burst of 4 transitions having two defined positions for the 2nd and 3rd transitions, spaced from equally spaced positions in said burst, to represent each of two bit values; and said bitstream is encoded in words comprised of one or more 4 bit symbols, said words separated by a 6 bit word separator symbol.

8. The sensible transition pattern of claim 7, wherein:

said two defined positions of said bursts of 5 transitions and said bursts of 4 transitions each comprises spacing of said transitions respectively toward or away from each other, from said equally spaced positions by approximately equal distances.

9. The sensible transition pattern of claim 8, wherein:

said bitstream word separator symbol pattern of 6 bits is encoded to begin in only said 4 transition bursts or in only said 5 transition bursts of said bitstream.

10. The sensible transition pattern of claim 9, wherein:

said encoded bitstream 4 bit symbols comprise ones of 14 different bit patterns of 4 bits each and 2 bit patterns of 4 bits are excluded as representing said word separator symbol.

11. The sensible transition pattern of claim 10, wherein:

said bitstream word separator symbol comprises a pattern of 6 bits combining said 2 excluded bit patterns of 4 bits.

12. The sensible transition pattern of claim 11, wherein:

said 2 excluded bit patterns of 4 bits comprise "0000" and "1000" and said word separator symbol comprises the 6 bits "100000".

13. A magnetic tape media having a prerecorded serial bitstream superimposed on a timing-based servo pattern recorded in magnetic flux transition patterns defining at least one longitudinal servo track, the pattern being periodic, each period comprising two bursts of 5 magnetic flux transitions followed by two bursts of 4 magnetic flux transitions, comprising:

each burst of 5 magnetic flux transitions having two defined positions for the 2nd and 4th magnetic flux transitions, spaced from equally spaced positions in said burst, to represent each of two bit values;

each burst of 4 magnetic flux transitions having two defined positions for the 2nd and 3rd magnetic flux transitions, spaced from equally spaced positions in said burst, to represent each of two bit values; and said bitstream is encoded in words comprised of one or more 4 bit symbols, said words separated by a 6 bit word separator symbol.

14. The magnetic tape media of claim 13, wherein:

said two defined positions of said bursts of 5 magnetic flux transitions and said bursts of 4 magnetic flux transitions each comprises spacing of said magnetic flux transitions respectively toward or away from each other, from said equally spaced positions by approximately equal distances.

15. The magnetic tape media of claim 14, wherein:

said bitstream word separator symbol pattern of 6 bits is encoded to begin in only said 4 magnetic flux transition bursts or in only said 5 magnetic flux transition bursts of said bitstream.

16. The magnetic tape media of claim 15, wherein:

said encoded bitstream 4 bit symbols comprise ones of 14 different bit patterns of 4 bits each and 2 bit patterns of 4 bits are excluded as representing said word separator symbol.

17. The magnetic tape media of claim 16, wherein:

said bitstream word separator symbol comprises a pattern of 6 bits combining said 2 excluded bit patterns of 4 bits.

18. The magnetic tape media of claim 17, wherein:

said 2 excluded bit patterns of 4 bits comprise "0000" and "1000" and said word separator symbol comprises the 6 bits "100000".

19. A data system for decoding a serial bitstream superimposed in a timing-based servo pattern on a moving storage medium, in the longitudinal direction of said moving storage medium, said servo pattern being periodic, each period comprising two bursts of 5 transitions followed by two bursts of 4 transitions, the 2nd and 4th transitions of 5 transition bursts having two defined positions to represent each of two bit values, and 2nd and 3rd transitions of 4 transition bursts having two defined positions to represent each of two bit values to represent each of two bit values, and said serial bitstream is encoded in words comprised of one or more 4 bit symbols, said words separated by a 6 bit word separator symbol, comprising:

a servo transducer sensing said servo transitions along said longitudinal direction with respect to said moving storage medium;

a detector responsive to said sensed servo transitions that detects the spacing between said positions of said defined position transitions of each said burst, and detects the spacing between two non-defined position transitions of each said burst; and a decoder responsive to said detected spacings that compares said spacings of said defined position transitions and said non-defined position transitions, and, in response to said comparisons, decoding said superimposed encoded symbols.

20. The data system of claim 19, wherein said two defined positions of said bursts of 5 transitions and said bursts of 4 transitions each comprises spacing of said 2nd and 4th transitions of said 5 transition bursts respectively toward or away from each other, and spacing of said 2nd and 3rd transitions of said 4 transition bursts respectively toward or away from each other, both from said equally spaced positions by approximately equal distances, and said non-defined position transitions are in equally spaced positions, and wherein:

said detector detects the spacing between said 2nd and 4th transitions of said 5 transition bursts, and detects the spacing between said 2nd and 3rd transitions of said 4 transition bursts, and detects the spacing between two non-defined position transitions of each said burst.

21. The data system of claim 20, wherein:

said detector accumulates the spacings between said defined position transitions of said two bursts of a 5 transition period and the spacings between two said non-defined position transitions of said two bursts of said 5 transition period for comparison, and accumulates the spacings between said defined position transitions of said two bursts of a 4 transition period and the spacings between two said non-defined position transitions of said two bursts of said 4 transition period for comparison.

22. The data system of claim 21, wherein:

said decoder additionally detects said 6 bit word separation symbols for identifying said words.

23. A magnetic tape drive having a timing-based servo control system for magnetic tape media, and for decoding a serial bitstream superimposed in said timing-based servo pattern, said servo pattern being periodic, each period comprising two bursts of 5 magnetic flux transitions followed by two bursts of 4 magnetic flux transitions, the 2nd and 4th magnetic flux transitions of 5 magnetic flux transition bursts having two defined positions to represent each of two bit values, and 2nd and 3rd magnetic flux transitions of 4 magnetic flux transition bursts having two defined positions to represent each of two bit values, and said serial bitstream is encoded in words comprised of one or more 4 bit symbols, said words separated by a 6 bit word separator symbol which begins in only said 5 transition bursts or in only said 4 transition bursts, said magnetic tape drive comprising:

a magnetic read and/or write head and read/write channel for reading and/or writing data on said magnetic tape media;

a drive mechanism for moving said magnetic tape media longitudinally with respect to said magnetic read and/or write head for reading and/or writing on said magnetic tape media;

a servo transducer sensing said servo magnetic flux transitions along said longitudinal direction with respect to said magnetic tape media as said drive mechanism moves said magnetic tape longitudinally and providing signals representative of said servo magnetic flux transitions;

a detector responsive to said sensed servo transition signals that detects the spacing between said positions of said defined position magnetic flux transitions of each said burst, and detects the spacing between two non-defined position magnetic flux transitions of each said burst; and a decoder responsive to said detected spacings that compares said spacings of said defined position magnetic flux transitions and said non-defined position magnetic flux transitions, and, in response to said comparisons and to the beginning of said 5 transition bursts and/or to the beginning of said 4 transition bursts, decoding said superimposed encoded symbols.

24. The magnetic tape drive of claim 23, wherein said two defined positions of said bursts of 5 magnetic flux transitions and said bursts of 4 magnetic flux transitions each comprises spacing of said 2nd and 4th magnetic flux transitions of said 5 magnetic flux transition bursts respectively toward or away from each other, and spacing of said 2nd and 3rd magnetic flux transitions of said 4 magnetic flux transition bursts respectively toward or away from each other, both from said equally spaced positions by approximately equal distances, and said non-defined position magnetic flux transitions are in equally spaced positions, and wherein:

said detector detects the spacing between said 2nd and 4th magnetic flux transitions of said 5 magnetic flux transition bursts, and detects the spacing between said 2nd and 3rd magnetic flux transitions of said 4 magnetic flux transition bursts, and detects the spacing between two non-defined position magnetic flux transitions of each said burst.

25. The magnetic tape drive of claim 24, wherein: said detector accumulates the spacings between said defined position magnetic flux transitions of said two bursts of a 5 magnetic flux transition period and accumulates the spacings between two said non-defined position magnetic flux transitions of said two bursts of said 5 magnetic flux transition period for comparison, and accumulates the spacings between said defined position magnetic flux transitions of said two bursts of a 4 magnetic flux transition period and accumulates the spacings between two said non-defined position magnetic flux transitions of said two bursts of said 4 magnetic flux transition period for comparison.

26. The magnetic tape drive of claim 25, wherein:

said decoder additionally detects said 6 bit word separation symbols for identifying said words.

27. The magnetic tape drive of claim 26, wherein said encoded bitstream 4 bit symbols comprise ones of 14 different bit patterns of 4 bits each and 2 bit patterns of 4 bits are excluded as representing said word separator symbol, and wherein:

said decoder additionally comprises decoding logic for decoding said 4 bit symbols into ones of said 14 different bit patterns.

28. A method for decoding a serial bitstream superimposed in a timing-based servo pattern on a moving storage medium, in the longitudinal direction of said moving storage medium, said servo pattern being periodic, each period comprising two bursts of 5 transitions followed by two bursts of 4 transitions, the 2nd and 4th transitions of 5 transition bursts having two defined positions to represent each of two bit values, and 2nd and 3rd transitions of 4 transition bursts having two defined positions to represent each of two bit values to represent each of two bit values, and said serial bitstream is encoded in words comprised of one or more 4 bit symbols, said words separated by a 6 bit word separator symbol which begins in only said 5 transition bursts or in only said 4 transition bursts, comprising the steps of:

sensing said servo transitions along said longitudinal direction with respect to said moving storage medium;

detecting, in response to said sensed servo transitions, the spacing between said positions of said defined position transitions of each said burst, and detecting the spacing between two non-defined position transitions of each said burst;

comparing, in response to said detected spacings, said spacings of said defined position transitions and said non-defined position transitions; and decoding, in response to said comparisons and to the detection of the sync mark and each symbol beginning of said 5 transition bursts or beginning of said 4 transition bursts, said superimposed encoded symbols.

29. The decoding method of claim 28, wherein said two defined positions of said bursts of 5 transitions and said bursts of 4 transitions each comprises spacing of said 2nd and 4th transitions of said 5 transition bursts respectively toward or away from each other, and spacing of said 2nd and 3rd transitions of said 4 transition bursts respectively toward or away from each other, both from said equally spaced positions by approximately equal distances, and said non-defined position transitions are in equally spaced positions, and wherein:

said detecting step comprises detecting the spacing between said 2nd and 4th transitions of said 5 transition bursts, and detects the spacing between said 2nd and 3rd transitions of said 4 transition bursts, and detects the spacing between two nondefined position transitions of each said burst.

30. The decoding method of claim 29, wherein:

said detecting step comprises accumulating the spacings between said defined position transitions of said two bursts of a 5 transition period and accumulating the spacings between two said non-defined position transitions of said two bursts of said 5 transition period for comparison, and accumulating the spacings between said defined position transitions of said two bursts of a 4 transition period and accumulating the spacing between two said non-defined position transitions of one of said two bursts of said 4 transition period for comparison.

31. The decoding method of claim 30, wherein:

said decoding step additionally comprises detecting said 6 bit word separation symbols for identifying said words.

32. The decoding method of claim 31, wherein said encoded bitstream 4 bit symbols comprise ones of 14 different bit patterns of 4 bits each and 2 bit patterns of 4 bits are excluded as representing said word separator symbol, and wherein:

said decoding step additionally comprises decoding said 4 bit symbols into ones of said 14 different bit patterns.

33. A method for encoding a serial bitstream in a timing-based servo pattern, the pattern being periodic, each period comprising at least one burst of X transitions followed by at least one burst of Y transitions, X and Y differing by at least one transition, comprising the steps of:

shifting specified transitions of said X transition burst to one of two defined positions to represent each of two bit values;

shifting specified transitions of said Y transition burst to one of two defined positions to represent each of two bit values; and encoding said serial bitstream in words of one or more 4 bit symbols, said words separated by a word separator symbol beginning in only said X transition bursts or in only said Y transition bursts.

34. The encoding method of claim 33 wherein:

said 4 bit symbols of said encoding step comprise ones of 14 different bit patterns of 4 bits each and 2 bit patterns of 4 bits are excluded as representing said word separator symbol.

35. A sensible transition pattern for recording a serial bitstream in a timing-based servo pattern on a recording medium, said pattern being periodic, each period comprising at least one burst of X transitions followed by at least one burst of Y transitions, X and Y differing by at least one transition, comprising:

each burst of X transitions having two defined positions for specified transitions to represent each of two bit values;

each burst of Y transitions having two defined positions for specified transitions to represent each of two bit values; and said bitstream is encoded in words comprised of one or more 4 bit symbols, said words separated by a word separator symbol beginning in only said X transition bursts or in only said Y transition bursts.

36. The sensible transition pattern of claim 35 wherein:

said encoded bitstream 4 bit symbols comprise ones of 14 different bit patterns of 4 bits each and 2 bit patterns of 4 bits are excluded as representing said word separator symbol.

37. A magnetic tape media having a prerecorded serial bitstream superimposed on a timing-based servo pattern recorded in magnetic flux transition patterns defining at least one longitudinal servo track, the pattern being periodic, each period comprising at least one burst of X magnetic flux transitions followed by at least one burst of Y magnetic flux transitions, X and Y differing by at least one magnetic flux transition, comprising:

each burst of X magnetic flux transitions having two defined positions for specified magnetic flux transitions to represent each of two bit values;

each burst of Y magnetic flux transitions having two defined positions for specified magnetic flux transitions to represent each of two bit values; and said bitstream is encoded in words comprised of one or more 4 bit symbols, said words separated by a word separator symbol beginning in only said X magnetic flux transition bursts or in only said Y magnetic flux transition bursts.

38. The magnetic tape media of claim 37, wherein:

said encoded bitstream 4 bit symbols comprise ones of 14 different bit patterns of 4 bits each and 2 bit patterns of 4 bits are excluded as representing said word separator symbol.

39. A magnetic tape drive having a timing-based servo control system for magnetic tape media, and for decoding a serial bitstream superimposed in said timing-based servo pattern, said servo pattern being periodic, each period comprising at least one burst of X magnetic flux transitions followed by at least one burst of Y magnetic flux transitions, X and Y differing by at least one magnetic flux transition, specified magnetic flux transitions of X magnetic flux transition bursts having two defined positions to represent each of two bit values, and specified magnetic flux transitions of Y magnetic flux transition bursts having two defined positions to represent each of two bit values, and said serial bitstream is encoded in words comprised of one or more 4 bit symbols, said words separated by a word separator symbol beginning in only said X magnetic flux transition bursts or in only said Y magnetic flux transition bursts, said magnetic tape drive comprising:

a magnetic read and/or write head and read/write channel for reading and/or writing data on said magnetic tape media;

a drive mechanism for moving said magnetic tape media longitudinally with respect to said magnetic read and/or write head for reading and/or writing on said magnetic tape media;

a servo transducer sensing said servo magnetic flux transitions along said longitudinal direction with respect to said magnetic tape media as said drive mechanism moves said magnetic tape longitudinally and providing signals representative of said servo magnetic flux transitions;

a detector responsive to said sensed servo transition signals that detects the spacing between said positions of said defined position magnetic flux transitions of each said burst, and detects the spacing between two non-defined position magnetic flux transitions of each said burst; and a decoder responsive to said detected spacings that compares said spacings of said defined position magnetic flux transitions and said non-defined position magnetic flux transitions, and, in response to said comparisons and to the beginning of said X transition bursts and/or the beginning of said Y transition bursts, decoding said superimposed encoded symbols.

* * * * *